US011055234B2

United States Patent
Gupta et al.

(10) Patent No.: US 11,055,234 B2
(45) Date of Patent: Jul. 6, 2021

(54) MANAGING ALLOCATION AND DEMOTION OF CACHE SEGMENTS BETWEEN A GLOBAL QUEUE AND A PLURALITY OF LOCAL QUEUES BY TRAINING A MACHINE LEARNING MODULE

(71) Applicant: INTERNATIONAL BUSINESS MACHINES CORPORATION, Armonk, NY (US)

(72) Inventors: Lokesh M. Gupta, Tucson, AZ (US); Kevin J. Ash, Tucson, AZ (US); Beth A. Peterson, Tucson, AZ (US); Matthew R. Craig, Sahuarita, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/418,914

(22) Filed: May 21, 2019

(65) Prior Publication Data

US 2020/0371959 A1   Nov. 26, 2020

(51) Int. Cl.
*G06F 12/126* (2016.01)
*G06F 12/0895* (2016.01)
(Continued)

(52) U.S. Cl.
CPC ........ *G06F 12/126* (2013.01); *G06F 12/0895* (2013.01); *G06F 12/123* (2013.01); *G06K 9/6256* (2013.01); *G06N 20/00* (2019.01)

(58) Field of Classification Search
CPC ............. G06F 12/0868; G06F 12/0802; G06F 2212/1016; G06F 12/0871;
(Continued)

(56) References Cited

U.S. PATENT DOCUMENTS 5,394,531 A   2/1995  Smith
6,163,773 A   12/2000 Kishi
(Continued)

OTHER PUBLICATIONS

List of IBM Patents or Patent Applications Treated as Related, May 21, 2019, 2 pp. [18.876 (Appendix P)].
(Continued)

*Primary Examiner* — Hashem Farrokh
(74) *Attorney, Agent, or Firm* — Konrad Raynes Davda & Victor LLP; David W. Victor (57) ABSTRACT

Provided are a computer program product, system, and method for managing cache segments between a global queue and a plurality of local queues by training a machine learning module. A machine learning module is provided input comprising cache segment management information related to management of segments in the local queues by the processing units and accesses of the global queue to transfer cache segments between the local queues and the global queue to output an optimum number parameter comprising an optimum number of segments to maintain in a local queue and a transfer number parameter comprising a number of cache segments to move between a local queue and the global queue. The machine learning module is retrained based on the cache segment management information to output an adjusted transfer number parameter and an adjusted optimum number parameter for the processing units.

23 Claims, 8 Drawing Sheets

(51) Int. Cl.
  *G06K 9/62* (2006.01)
  *G06N 20/00* (2019.01)
  *G06F 12/123* (2016.01)

(58) Field of Classification Search
  CPC ..... G06F 2212/1041; G06F 2212/1024; G06F 12/0895; G06F 12/123; G06F 12/126; G06N 20/00; G06N 3/084; G06K 9/6256
  USPC ......................................................... 711/118
  See application file for complete search history.

(56) References Cited

U.S. PATENT DOCUMENTS

| | | | |
|---|---|---|---|
| 8,407,421 B2 | 3/2013 | Steely, Jr. et al. | |
| 8,463,984 B2 | 6/2013 | Olds et al. | |
| 9,098,423 B2 | 8/2015 | Cho | |
| 9,292,448 B2 | 3/2016 | Daly | |
| 10,089,238 B2 | 10/2018 | Palacharla et al. | |
| 2017/0344265 A1* | 11/2017 | Ash | G06F 3/0611 |
| 2018/0285718 A1 | 10/2018 | Baum et al. | |
| 2018/0332366 A1* | 11/2018 | Paduroiu | G06F 16/2358 |
| 2019/0310940 A1 | 10/2019 | Ash et al. | |
| 2019/0377610 A1* | 12/2019 | Gupta | G06F 9/5038 |

OTHER PUBLICATIONS

U.S. Appl. No. 16/418,904, filed May 21, 2019, 39 pp. [18.866 (Appln)].

Office Action 1 for U.S. Appl. No. 16/418,904, dated Aug. 17, 2020, pp. [18.866 (OA1)].

Response to Office Action 1 for U.S. Appl. No. 16/418,904, dated Nov. 10, 2020, 11 pp. [18.866 (ROA1)].

Notice of Allowance 1 for U.S. Appl. No. 16/418,904, dated Feb. 21, 2021, 17 pp.

* cited by examiner

| 402 | 404 | 406 | 408 | 410 | 412 | 414 |
|---|---|---|---|---|---|---|
| CPU Number | Role (Demoter, Allocator) | Number of Segments in Local Queue | Average Lock Contention Time for Global Queue | Average Lock Held Time for Global Queue | Demotion Rate to Global Queue | Allocation Rate From Global Queue |

Local Queue Management Information

FIG. 4

| 502 | 504 | 506 | 508 | 510 | 512 | 514 | 516 |
|---|---|---|---|---|---|---|---|
| CPU Roles Vector | Number of CPUs | Number of Allocator CPUs | Number of Demoter CPUs | Number of Segments Allocated Vector | Number of Segments in Global Queue | Desired Size of Global Queue | Rate of Demotion Vector |

| 518 | 520 | 522 | 524 | 526 | 528 |
|---|---|---|---|---|---|
| Rate of Allocation Vector | Number of Dedicated Demoters | Number of Dedicated Allocaters | Average Lock Held Time of Allocators Vector | Average Lock Held Time of Demoters Vector | Average Lock Contention Time of Allocators Vector |

| 530 | 532 |
|---|---|
| Average Lock Contention Time of Demoters Vector | Demote/Allocate Operations of CPUs Vector |

FIG. 5

Global Queue Management Information

MANAGING ALLOCATION AND DEMOTION OF CACHE SEGMENTS BETWEEN A GLOBAL QUEUE AND A PLURALITY OF LOCAL QUEUES BY TRAINING A MACHINE LEARNING MODULE

BACKGROUND OF THE INVENTION

1. Field of the Invention

The present invention relates to a computer program product, system, and method for managing allocation and demotion of cache segments between a global queue and a plurality of local queues by training a machine learning module.

2. Description of the Related Art

A cache management system buffers tracks in a storage device recently accessed as a result of read and write operations in a faster access storage device, such as memory, than the storage device storing the requested tracks. Subsequent read requests to tracks in the faster access cache memory are returned at a faster rate than returning the requested tracks from the slower access storage, thus reducing read latency. The cache management system may also return complete to a write request when the modified track directed to the storage device is written to the cache memory and before the modified track is written out to the storage device, such as a hard disk drive. The write latency to the storage device is typically significantly longer than the latency to write to a cache memory. Thus, using cache also reduces write latency.

A storage controller using the cache may have multiple processors, such as central processing units on one or more cores, requiring cache segments in the cache to use for Input/Output ("I/O") operations. Each processor CPU may be allocated cache segments from a central global queue providing cache segments in a shared memory among the processors. If the local queue at a processor has a low number of available cache segments, then the processor needs to obtain a lock for the global queue to access a batch of cache segments indicated in the global queue to allocate to the local queue to use for I/O operations. Further, if the local queue of the processor has relatively too many available cache segments, then the processor may need to take available cache segments indicated on the local queue to move to the global queue to make available for other processors in the storage controller.

Described embodiments provide improved techniques to manage the provisioning of cache segments from a global queue to the local queues of processors to use for I/O operations.

SUMMARY

Provided are a computer program product, system, and method for managing cache segments between a global queue and a plurality of local queues by training a machine learning module. A machine learning module is provided input comprising cache segment management information related to management of segments in the local queues by the processing units and accesses of the global queue to transfer cache segments between the local queues and the global queue to output an optimum number parameter comprising an optimum number of segments to maintain in a local queue and a transfer number parameter comprising a number of cache segments to move between a local queue and the global queue. The transfer number parameter for at least one of the processing units is adjusted to produce an adjusted transfer number parameter. The optimum number parameter for at least one of the processing units is adjusted to produce an adjusted optimum number parameter. The machine learning module is retrained based on the cache segment management information to output the adjusted transfer number parameter and the adjusted optimum number parameter for the processing units. The retrained machine learning module is used to output the transfer number parameter and the optimum number parameter for the processing units to use to manage transferring cache segments between the local queues and the global queue.

DETAILED DESCRIPTION

Cache segments of a cache memory may be allocated to processing units to use for read and write operations in local queues. Processors do not need to obtain a lock to access cache segments in their local queue. However, if the local queue has a relatively low number of cache segments needed to allocate to I/O operations, then the processing unit must obtain a lock to a global queue from which it can allocate more cache segments to the local queue. Further, if the local queue has a number of cache segments exceeding an optimum number, then the processing unit must obtain a lock on the global queue to demote cache segments from the local queue to the global queue. Because multiple processing units may be accessing the global queue to obtain and return cache segments, other processing units will experience latency delays to obtain the lock, which will introduce latency for their task processing as they wait to obtain a lock for the global queue to allocate or demote cache segments.

Described embodiments provide improvements to computer technology for managing a global queue of cache segments for processing units by optimizing processing units operations with respect to their local queues in a manner that maintains a sufficient number of cache segments in the local queue to minimize or reduce the need for the processing unit to access the global queue to access or return resources. Described embodiments control the number of lock requests to reduce latency in obtaining a lock to the global queue by adjusting the number of cache segments transferred between the local queue and the global queue. Increasing the number of cache segments to transfer reduces lock contention by reducing the frequency at which the processing units need to request the lock to access the global queue.

In described embodiments, cache segment management information related to management of segments in the local queues and accesses to the global queue to transfer cache segments between the local queues and the global queue is provided to a machine learning module to output an optimum number parameter comprising an optimum number of segments to maintain in a local queue and a transfer number parameter comprising a number of cache segments to move between a local queue and the global queue. The optimum number parameters and the transfer number parameters are sent to the processing units to use to transfer the transfer number parameter of cache segments from the local queue to the global queue in response to determining that a number of segments in the local queue exceeds the optimum number parameter and to transfer the transfer number parameter of cache segments from the global queue to the local queue in response to determining that a number of segments in the local queue is less than the optimum number parameter.

Described embodiments further provide improvements to computer technology to retrain the machine learning module to reduce errors. In described embodiments, the transfer number parameter for at least one of the processing units is adjusted based on current lock contention time for the global queue indicating an amount of time a processing unit waits to access a lock for the global queue. The optimum number parameter for at least one of the processing units is adjusted based on based on a number of cache segments in the global queue. The machine learning module is retrained based on the cache segment management information to produce adjusted transfer number parameters and adjusted optimum number parameters for the processing units.

Figure 1:
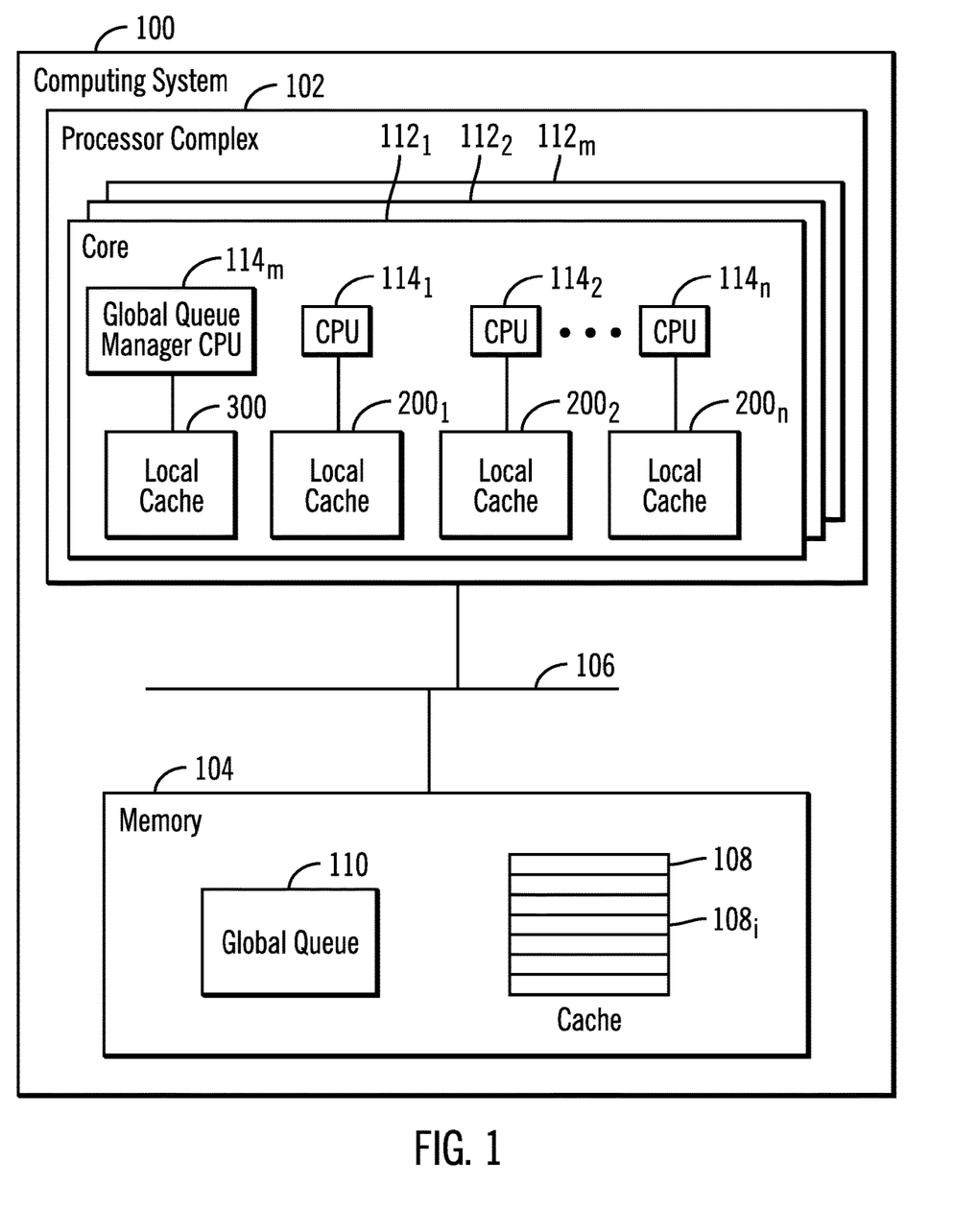
FIG. 1 illustrates an embodiment of a computing environment.

FIG. 1 illustrates an embodiment of a computing system 100 having a processor complex 102 that may access a memory 104 over a system bus 106 to access cache segments $108_i$ in a cache 108 in the memory 104. In additional embodiments, instead of cache segments $108_i$ comprising a cache 108, the processor complex 102 may access other types of resources, such as log spaces in a database and any other process or task executing in the processor complex 102 can access, consume, and release. A global queue 110 indicates cache segments 108 that are available for allocation to the processor complex 102.

The processor complex 102 may include a plurality of processing cores $112_i$ . . . $112_m$, where each core $112_i$, as shown with respect to core $112_1$, includes a plurality of central processing units (CPUs) $114_1$, $114_2$ . . . $114_n$, also referred to herein as processors or processing units. Each of the CPUs $114_1$, $114_2$ . . . $114_n$ include a local cache $200_1$, $200_2$ . . . $200_n$, such as an L1 cache, in which information used just by the corresponding CPU $114_1$, $114_2$ . . . $114_n$ is maintained. A CPU $114_1$, $114_2$ . . . $114_n$ does not need to obtain a lock to access information in its local cache $200_1$, $200_2$ . . . $200_n$. Thus, there is no lock latency for a CPU $114_i$ to access resources, such as cache segments allocated from the global queue 110, in its own local cache $200_i$. The global queue 110 may be accessed by CPUs $114_1$, $114_2$ . . . $114_n$, on any of the cores $112_1$ . . . $112_m$ to return available cache segments $108_i$ to the global queue 110 or obtain cache segments $108_i$ to include in a local queue to consume.

A global queue manager CPU $114_m$ has a local cache 300 to manage other CPUs access to the global queue 110 and cache 108 to retrieve and return cache segments $108_i$ to the global queue 110.

In the embodiment of FIG. 1, the memory 104 is external to the cores $112_i$. In alternative embodiments, each core $112_i$ may include a shared memory for the CPUs $114_i$ on the core $112_i$, and the operations described herein to allocate/demote cache segments between the CPUs $114_i$ and global queue 110 may be performed with respect to a shared memory on each of the cores $112_i$.

The term "processing unit" and "processor" as used herein that executes tasks and operations may comprise a CPU $114_1$, $114_2$ . . . $114_m$, $114_n$ in one or more cores in one or more integrated circuit dies. Further, the "processor" and "processing unit" may comprise a virtual processor performing operations with respect to a virtual memory and cache, which are implemented in a physical host processing and memory resources.

In certain embodiments, the computing system 100 comprises a storage controller providing access to shared non-volatile storage.

Figure 2:
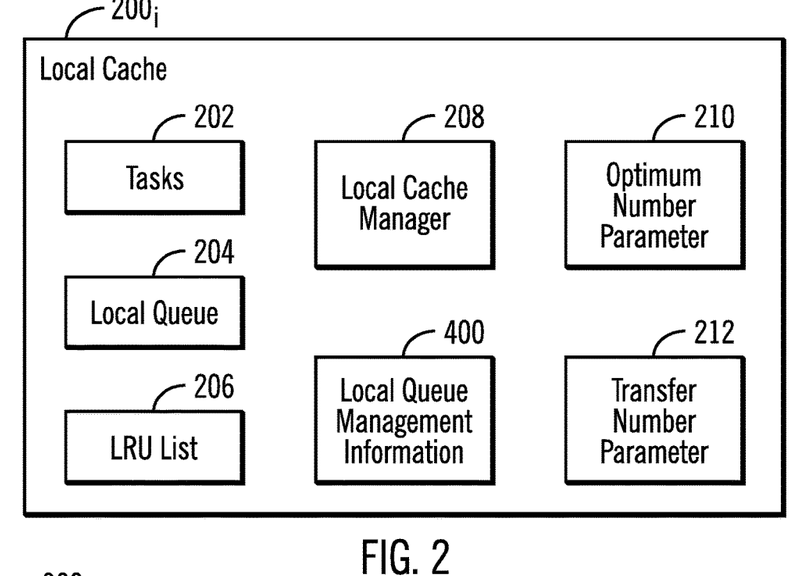
FIG. 2 illustrates an embodiment of a local cache used by a processing unit.

FIG. 2 illustrates an embodiment of the local cache $200_i$, such as one of the local caches $200_1$, $200_2$ . . . $200_n$, for a CPU $114_i$. A local cache $200_i$ may include one or more tasks 202 being executed by the CPU $114_i$, a local queue 204 of cache segments $108_i$ obtained from the global queue 110 that are available to allocate for use by the tasks 202; a Least Recently Used (LRU) list 206 of cache segments allocated from the local queue 204 for use by the tasks 202; a local cache manager 208 to manage allocation of cache segments $108_i$ indicated in the local queue 204 to the LRU list 206 and to demote cache segments $108_i$ from the LRU list 206 to the local queue 204; local queue management information 400 having information on management of cache segments in the local queue 204 and accesses of the global queue 110 to retrieve or return cache segments; an optimum number parameter 210 comprising an optimum number of cache segments to maintain in the local queue 204 as determined by a machine learning module; and a transfer number parameter 212 comprising a number of cache segments $108_i$ to move between the local queue 204 and the global queue 110.

Figure 3:
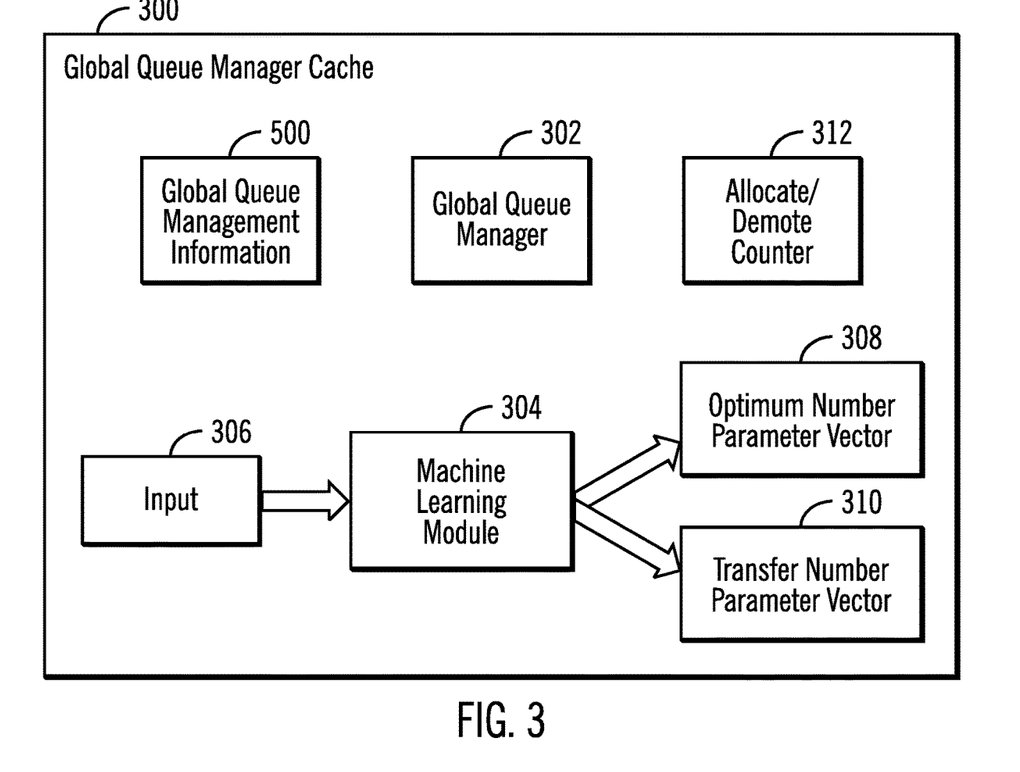
FIG. 3 illustrates an embodiment of a global queue manager cache used by a processing unit to manage the global queue across processing units.

FIG. 3 illustrates an embodiment of the global queue manager cache 300 that includes a global queue manager 302 to manage access to the global queue 110; global queue management information 500 having information on management of cache segments across all local queues 204 and accesses by all of the CPUs $114_i$ of the global queue 110 to allocate or return cache segments $108_i$; a machine learning module 304 that receives as input 306 some or all of the global queue management information 500 for all the CPUs $114_i$ and computes an optimum number parameter vector 308 that includes an optimum number parameter 210 for every CPU $114_i$ and a transfer number parameter vector 310 that includes a transfer number parameter 212 for every CPU $114_i$. An allocate/demote counter 312 that indicates, for every CPU $114_i$, a number of allocate/demote operations with respect to the global queue 110.

The machine learning module 304 implements a machine learning technique such as decision tree learning, association rule learning, artificial neural network, inductive programming logic, support vector machines, Bayesian models, etc. The local cache managers 208 may then use the outputted optimum number parameter 210 and transfer number parameter 212 in the vectors 308 and 310, respectively, to determine when to request more cache segments $108_i$ from the global queue manager 302 or when to return/demote the transfer number parameter 212 of cache segments from the local queue 204 to the global queue 110. The arrows shown from the input 306 to the machine learning module 304 and to the outputs 308, 310 illustrate a flow of data to and from the machine learning module 304 and not actual structures in the cache 300.

In one embodiment, the machine learning modules 304 may comprise artificial neural network programs. Each neural network may be trained using backward propagation to adjust weights and biases at nodes in a hidden layer to produce the computed optimum number parameter vector 308 and transfer number parameter vector 310. In backward propagation used to train a neural network machine learning module, margin of errors are determined based on operational parameters, such a margin of error of an adjusted transfer number parameter for each processing unit and a current transfer number parameter calculated for each processing unit to adjust weights and biases at nodes in a hidden layer of the machine learning module to produce the adjusted transfer number parameter. A margin of error of an adjusted optimum number parameter for each processing unit and a current optimum number parameter calculated for each processing unit may be used to adjust weights and biases at nodes in the hidden layer of the machine learning module to produce the adjusted optimum number parameter.

Backward propagation may comprise an algorithm for supervised learning of artificial neural networks using gradient descent. Given an artificial neural network and an error function, the method may calculate the gradient of the error function with respect to the neural network's weights and biases.

The components of the local cache $200_i$ and global queue manager cache 300 are shown in FIGS. 2 and 3 as program code loaded into the memory 104 and executed by the CPUs $114_i$. Alternatively, some or all of the components functions may be implemented in hardware devices, such as in Application Specific Integrated Circuits (ASICs), Field Programmable Gate Array (FPGA) or executed by separate dedicated processors.

The memory 104 may comprise one or more memory devices volatile or non-volatile, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (FeTRAM), nanowire-based non-volatile memory, and Non-Volatile Direct In-Line Memory Modules (DIMMs), NAND storage, e.g., flash memory, Solid State Drive (SSD) storage, non-volatile RAM, etc.

The local caches $200_i$ and 300 may comprise an L1 cache or a local cache dedicated to the CPU $114_i$.

Figure 4:
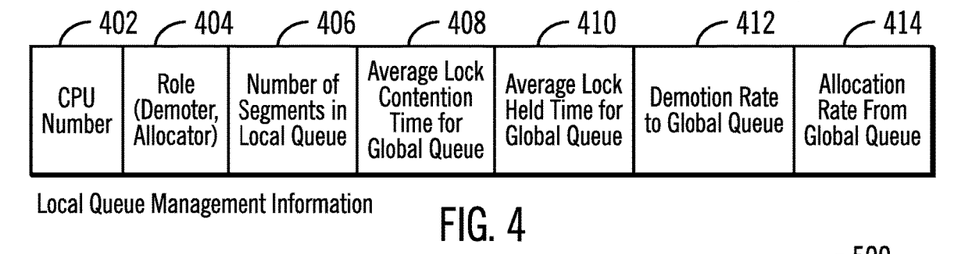
FIG. 4 illustrates an embodiment of local queue management information gathered at processing units.

FIG. 4 illustrates an embodiment of local queue management information 400 maintained in each local cache $200_i$ and includes: a CPU number 402 specifically identifying one of the CPUs $114_i$; a role 404 of the CPU $114_i$ as a demoter assigned to demote cache segments $108_i$ from the local queue 204 to the global queue 110 and/or an allocator assigned to allocate cache segments $108_i$ from the global queue 110 to the local queue 204; a number of cache segments in the local queue 406; an average lock contention time for the global queue 408 comprising a time the CPU $114_i$ spins or waits until receiving a lock for the global queue 110; and an average lock held time for the global queue 410 comprising a time the CPU $114_i$ holds the lock to the global queue 110; a demotion rate 412 to demote cache segments from the local queue 204 to the global queue 110; and an allocation rate 414 to allocate cache segments $108_i$ from the global queue 110 to the local queue 204. The local cache manager 208 may send the local queue management information 400 to the global queue manager 302 to add to the global management information 500.

Certain CPUs $114_i$ may be dedicated demoters and/or allocators, meaning they maintain that role. Other CPUs need to obtain the role of allocator and demoter, where there are a limited number of CPUs $114_i$ that may have the role of demoter or allocator. For instance, a CPU $114_i$ needs to obtain the role of allocator to allocate cache segments $108_i$ from the global queue 110 to the local queue 204 and obtain the role of demoter to demote cache segments $108_i$ from the local queue 204 to the global queue 110. The number of CPUs $114_i$ that may function as demoter and allocator with respect to the global queue 110 is limited to limit lock contention time to the global queue 110 and latency delays to allocate and demote cache segments $108_i$ between the local 204 and global 110 queues.

Figure 5:
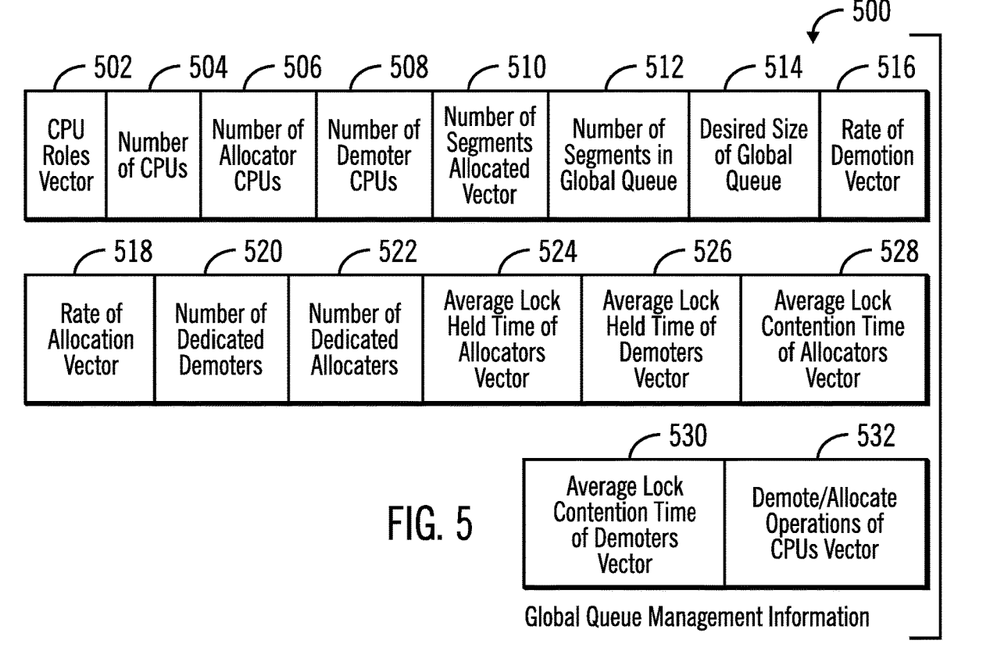
FIG. 5 illustrates an embodiment of global queue management information gathered from the local queue management information at the processing units.

FIG. 5 illustrates an embodiment of global queue management information 500 maintained in the global queue manager cache 300 to use as input 306 to the machine learning module 304 to generate new parameters 308, 310 for the CPUs $114_i$ and includes: a CPU roles vector 502 indicating the roles, allocator and/or demoter, for each of the CPUs $114_i$; total number of CPUs 502 in the system 100; number of allocator CPUs 506 assigned the allocator role; number of demoter CPUs 508 assigned the role of demoter; number of segments allocated vector 510 indicating the number of cache segments $108_i$ in the local queue 204 of each CPU $114_i$; number of segments in the global queue 512; desired size of global queue 514 in terms of number of cache segments $108_i$; rate of demotion vector 516 having the rate each CPU $114_i$ demotes cache segments from the local queue 204 to the global queue 110; a rate of allocation vector 518 having the rate each CPU $114_i$ allocates cache segments $108_i$ from the global queue 110 to the local queue 204; a number of dedicated demoters 520 comprising list of dedicated demoter CPUs $114_D$ that are dedicated and will always have the demoting role; a number of dedicated allocators 522 comprising list of allocator CPUs $114_A$ that are dedicated and will always have the allocating role; an average lock held time of allocators vector 524 comprising a list of the average time the lock to the global queue 110 was held by allocator CPUs $114_A$; an average lock held time of demoters vector 526 comprising a list of the average time the lock to the global queue 110 was held by demoter CPUs 114; an average lock contention time of allocators vector 528 comprising a list of the average lock contention time of allocator CPUs $114_A$ waited for the lock to the global queue 110; an average lock contention time of demoters vector 530 comprising a list of the average lock contention time of demoter CPUs $114_D$ waited for the lock to the global queue 110; and demote/allocate operations of CPUs vector 532 comprising a list of a number of demote and allocation operations with respect to the global queue 110 at CPUs $114_i$.

Figure 6:
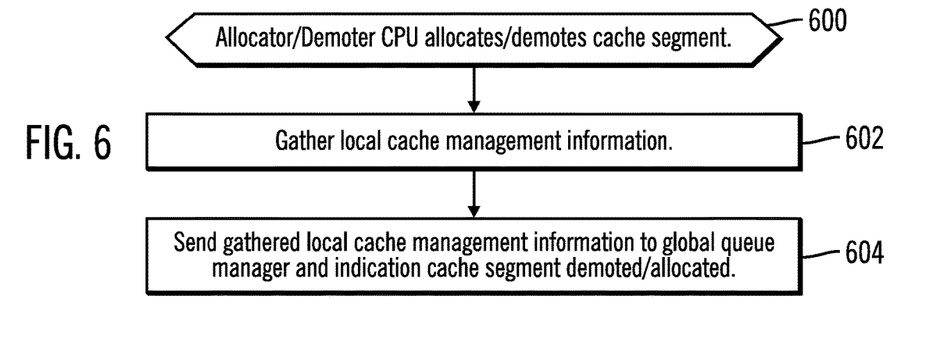
FIG. 6 illustrates an embodiment of operations for a processing unit to allocate and demote cache segments with respect to a local queue and a global queue.

FIG. 6 illustrates an embodiment of operations performed by the local cache manager 208 at an allocator/demoter CPU 114$_i$ in response to allocating/demoting a cache segment between the global queue 110 and the local queue 204. In response to allocating a cache segment from the global queue 110 to a local queue 204 in a CPU 114$_i$ or demoting a cache segment 108$_i$ from the local queue 204 to the global queue 110 (at block 600), the local cache manager 208 gathers (at block 602) the local queue management information 400 and sends (at block 604) the gathered local queue management information 400 to the global queue manager 302 and indication that a cache segment was demoted/allocated.

With the embodiments of FIG. 6, the CPUs 114$_i$ notify the global queue manager CPU 114$_m$ when cache segments have been allocated or demoted with respect to the global queue 110 and provide local queue management information 400 to provide real-time information to the global queue manager 302 of state changes and performance with respect to global queue 110 operations. This sharing of information from the CPUs 114$_i$ and the global queue manager provide the machine learning module 304 the most current information to best optimize the optimum number parameter vector 308 and transfer number parameter vector 310.

Figure 7:
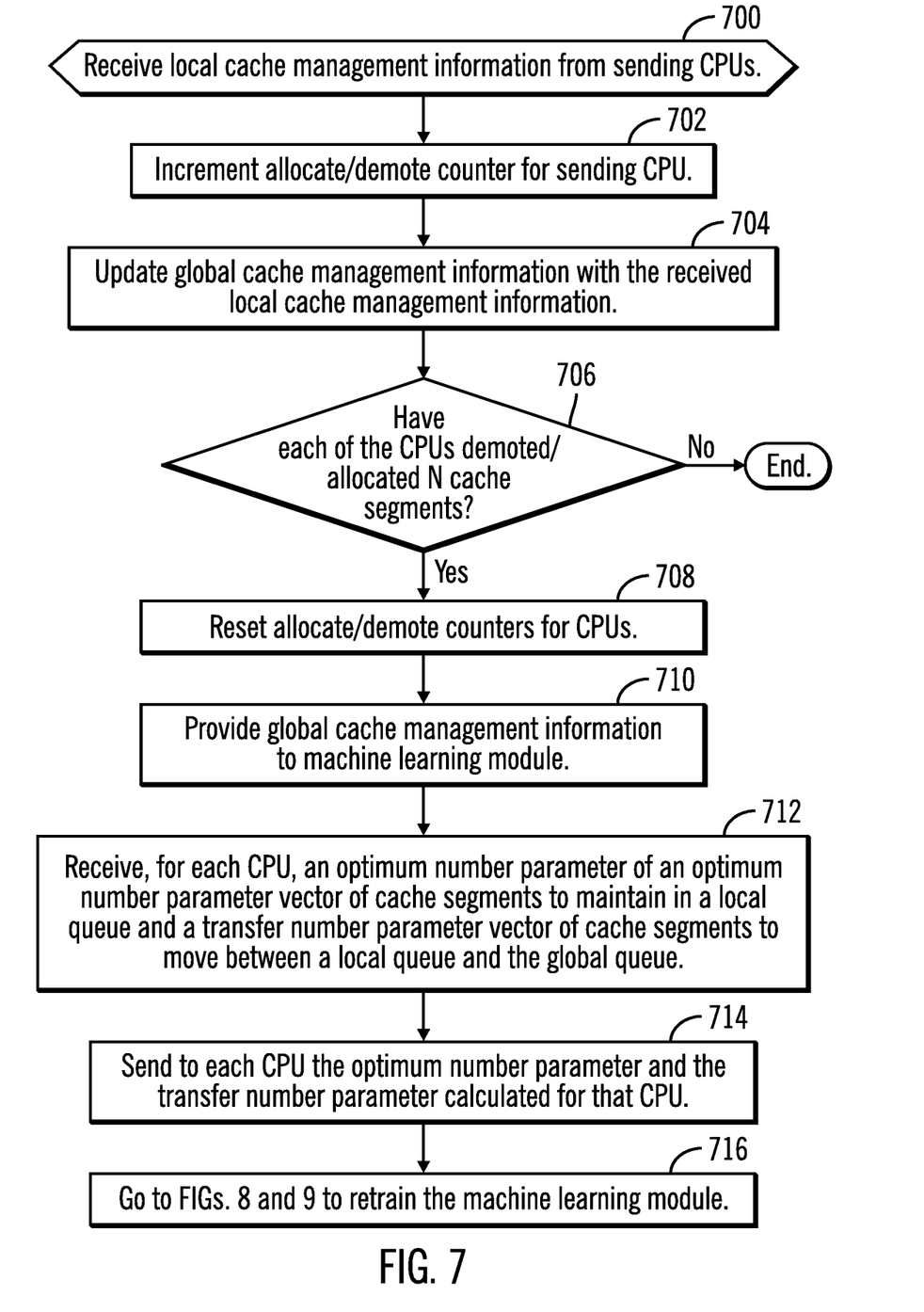
FIG. 7 illustrates an embodiment of operations to use a machine learning module to provide an optimum number parameter of cache segments to maintain in the local queues of the processing units and a transfer number parameter of cache segments for the processing units to move between the local queues and the global queue.

FIG. 7 illustrates an embodiment of operations performed by the global queue manager 302 upon receiving local queue management information 400 from one of the CPUs 114$_i$ upon performing a demoting or allocation operation with respect to the global queue 110. Upon receiving (at block 700) local queue management information 400, the global queue manager 302 increments the allocate/demote counter 312 for the CPU 114$_i$ that sent the local queue management information 400. The global queue management information 500 is updated with the received local queue management information 400 to make current. If (at block 706) all of the allocating/demoting CPUs have demote/allocated N cache segments, as indicated in the allocate/demote counter 312, then the counters 312 are reset (at block 708) for all CPUs 114$_i$. The global queue management information 500, with information on allocate/deallocate operations and access to the global queue 110 for all CPUs, is provided (at block 710) as input 306 to the machine learning module 304. The global queue manager 302 receives (at block 712), for each CPU 114$_i$, an optimum number parameter vector 308 of an optimum number parameter 210 of cache segments to maintain in a local queue 204 and a transfer number parameter vector 310 of cache segments to move between a local queue and the global queue 110. The global queue manager 302 sends (at block 714) to each CPU 114$_i$ the optimum number parameter 308 and the transfer number parameter 310 calculated specifically for that CPU 114$_i$. Control then proceeds to FIGS. 8 and 9 to retrain the machine learning module 304 to account for changes in the global queue management information 500. In an alternative embodiment, the retraining operations of FIGS. 8 and 9 may be initiated based on an event other than the event at block 706 that triggers running the machine learning module 304 to recalculate the parameters 308, 310, such as the occurrence of a different number of demote/allocate operations at the CPUs.

With the embodiment of operations of FIG. 7, current global queue management information 500 is used to determine the parameters the CPUs 114$_i$ use to determine when to allocate more cache segments from the global queue 110 and to demote and return cache segments 108$_i$ to the global queue 110. Each CPU 114$_i$ is provided operational parameters based on that CPUs 114$_i$ specific operations and performance and the operations of all the CPUs 114$_i$ with respect to the global queue 110. For instance, if CPUs 114$_i$ are experiencing high lock contention times for the global queue 110, then the transfer number 310 of cache segments may be increased to transfer more cache segments for one allocate/demote operation to reduce the total number of transactions to the global queue 110 to reduce lock contention. If lock contention is relatively low, then the transfer number 310 may be reduced to allow for more global queue 110 transactions and lock requests.

Figure 8:
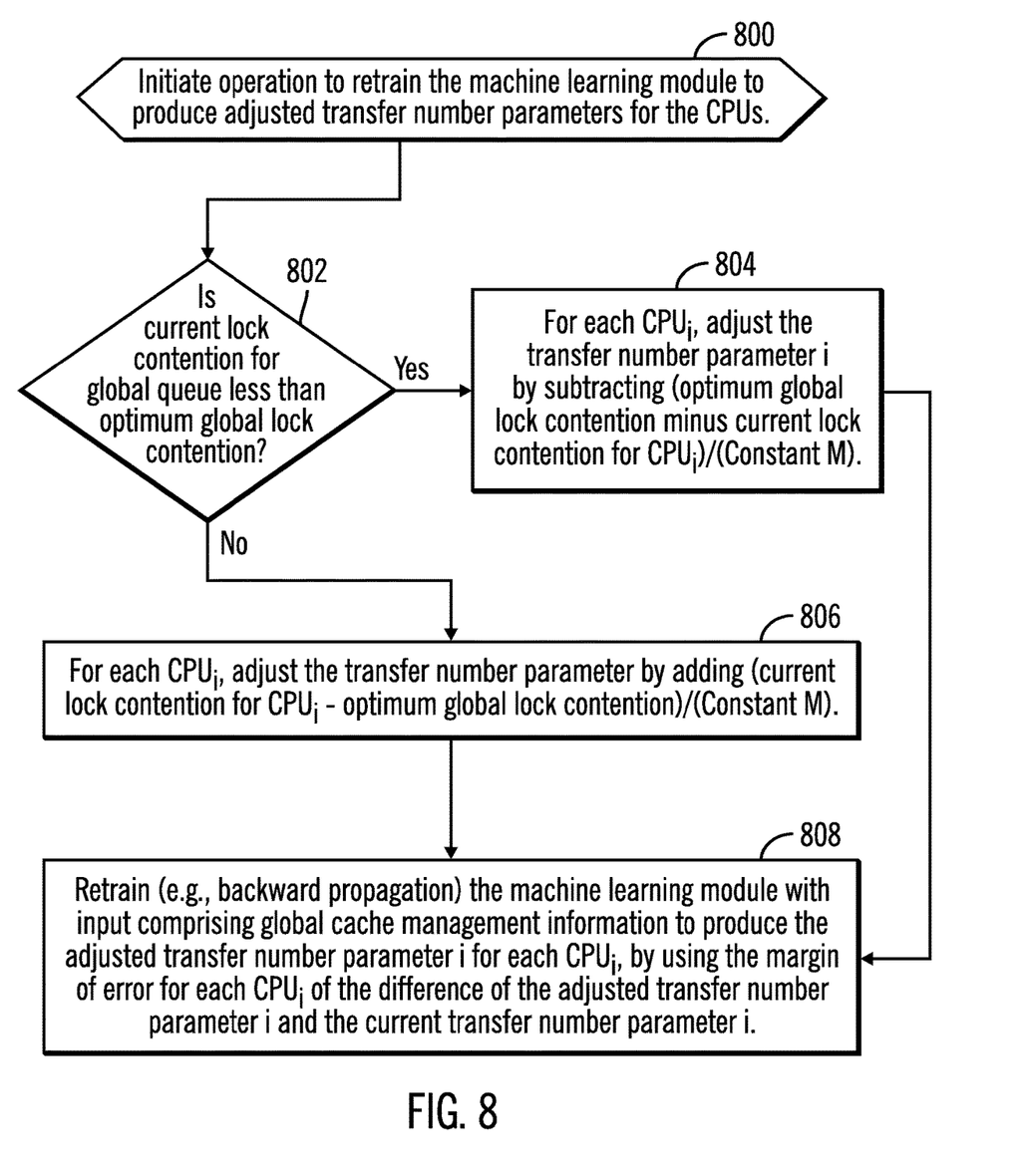
FIG. 8 illustrates an embodiment of operations to retrain a machine learning module to produce adjusted transfer number parameters for the processing units to use.

FIG. 8 illustrates an embodiment of operations performed by the global queue manager 302 and/or machine learning module 304, or other component to retrain the machine learning module 304 to produce the transfer number parameter vector 310 for all CPUs 114$_i$ to use based on current system and lock contention performance at the global queue 114 as reflected in the global queue management information 500. Upon initiating (at block 800) the operation to retrain the machine learning module 304 based on lock contention and hold times experienced by the CPUs 114$_i$, a determination is made (at block 802) whether the current global lock contention, such as the average lock contention times in vectors 528, 530 across all CPUs, is less than an optimum global lock contention. If so, then for each CPU 114$_i$, the transfer number parameter i for CPU 114$_i$ is adjusted by calculating (at block 804) the current transfer number parameter i for CPU 114$_i$, as determined in a previously determined transfer number parameter vector 310, minus the (optimum global lock contention minus current lock contention for CPU 114$_i$ divided by a Constant M. The constant M converts a unit expressed in lock contention time to a number of cache segments to transfer unit. If (at block 802) the current lock contention for the global queue 110 is not less than the optimum global lock contention, then, for each CPU 114$_i$, the transfer number parameter i for CPU 114$_i$ is adjusted by calculating (at block 806) the current transfer number parameter i for CPU 114$_i$, as determined in a previously determined transfer number parameter vector 310, plus the (the current lock contention for CPU 114$_i$ minus the optimum global lock contention) divided by a Constant M.

The machine learning module 304 is retrained (at block 808), such as using backward propagation, with input comprising the global queue management information 500 to produce the adjusted transfer number parameter 310$_i$ for each CPU 114$_i$, by using the margin of error for each CPU 114$_i$ of the difference of the adjusted transfer number parameter 310$_i$ and the current transfer number parameter 212.

With the embodiment of FIG. 8, the transfer number parameter 310 for a CPU 114$_i$ is reduced by a difference, or margin of error, of the optimum global lock contention and the current lock contention time for a CPU 114$_i$ if the current lock contention time for a CPU exceeds the optimum global lock contention. Thus, the transfer number parameter 310 for a particular CPU 114$_i$ is reduced if there is relatively low lock contention, less than the optimum amount, to allow for a greater number of global queue lock requests by transferring fewer cache segments for each allocate/deallocate operation. Transferring fewer cache segments allows for more fine grain tuning of the adjustment of the local queue by allowing for more allocation/demote operations, which results in a greater number of lock contention requests. If the lock contention is relatively high, greater than an optimum amount, then the transfer number for that CPU 114$_i$ is increased to reduce the number of times allocate and demote operations are needed, by transferring more cache segments at a time, which results in fewer demote/allocate requests and less lock contention. The machine learning module 304 is thus retrained to produce these new transfer number parameters to reflect current lock contention performance for the global queue 110.

Figure 9:
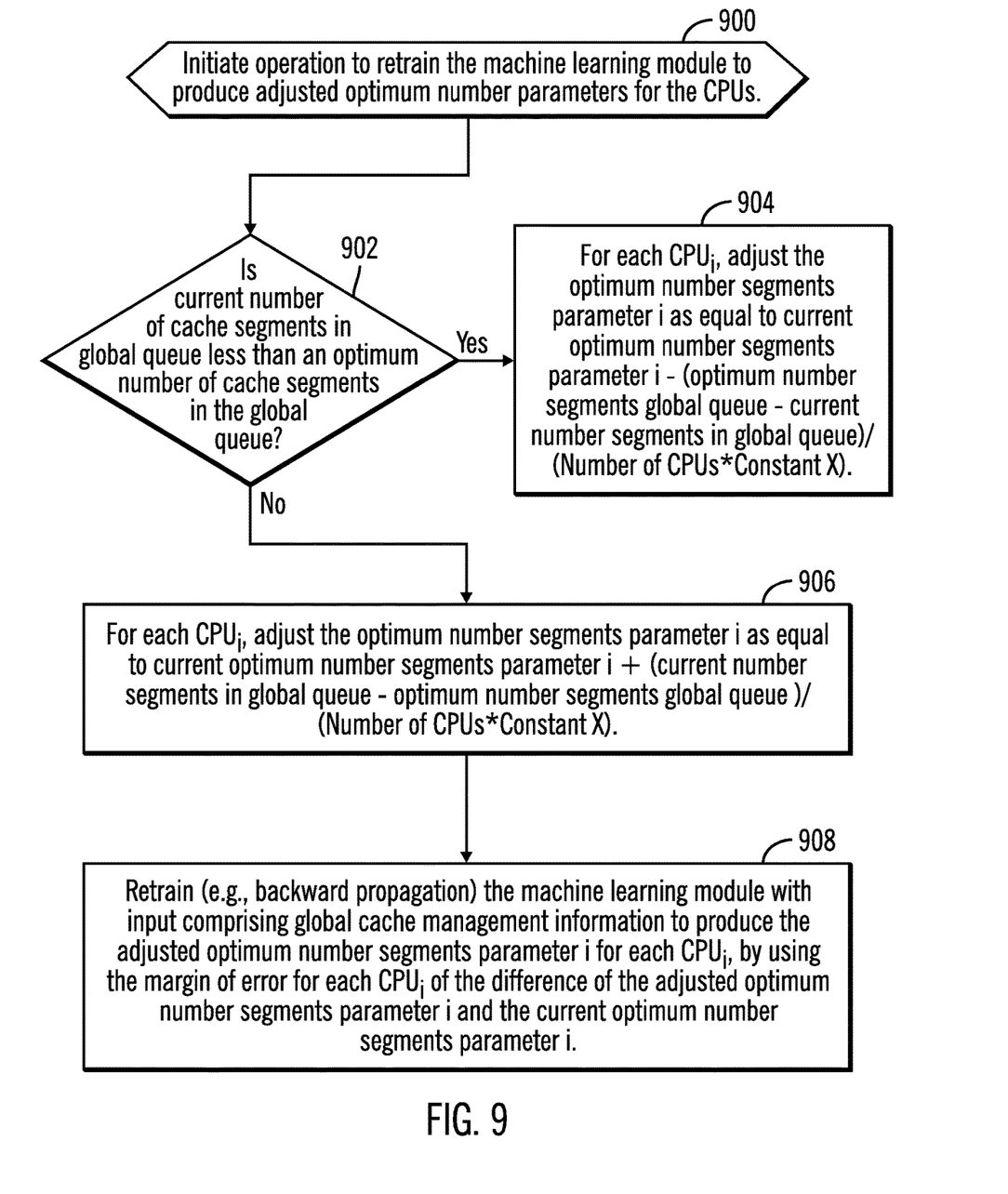
FIG. 9 illustrates an embodiment of operations to retrain a machine learning module to produce adjusted optimum number parameters for the processing units to use.

FIG. 9 illustrates an embodiment of operations performed by the global queue manager 302 and/or machine learning module 304, or other component to retrain the machine learning module 304 to produce the optimum number parameter vector 308 for all CPUs $114_i$ to use based on current status of the global queue 110, as reflected in the global queue management information 500. Upon initiating (at block 900) the operation to retrain the machine learning module 304 based on global queue 110 size, a determination is made whether (at block 902) the current number of cache segments in the global queue 512 is less than an optimum number of cache segments for the global queue 110. If so, then for each CPU $114_i$, the optimum number parameter i for CPU $114_i$ is adjusted by setting (at block 904) the current optimum number parameter i for CPU $114_i$, as determined in a previously determined transfer number parameter vector 310, minus the (optimum number of cache segments in the global queue minus the current number of cache segments in the global queue 512) divided by (Number of CPUs times a Constant X). The constant X converts a unit expressed in number of segments in the global queue 110 to an optimum number of cache segments for a local queue 204. If (at block 902) the number of cache segments in the global queue 512 is not less than the optimum number of cache segments in the global queue 110, then for each CPU $114_i$, the optimum number of segments parameter i for CPU $114_i$ is adjusted by setting (at block 906) the current optimum number segments parameter i for CPU $114_i$, as determined in a previously determined optimum number parameter vector 308, plus the (the current number of segments in the global queue 512 minus the optimum number segments in the global queue global lock contention) divided by the (Number of CPUs times a Constant X).

The machine learning module 304 is retrained (at block 908), such as using backward propagation, with input comprising the global queue management information 500 to produce the adjusted optimum number parameter $308_i$ for each CPU $114_i$, by using the margin of error for each CPU $114_i$ of the difference of the adjusted optimum number parameter i and the current optimum number parameter i.

With the embodiment of FIG. 9, the optimum number parameter 308 for a CPU $114_i$ is reduced by a difference, or margin of error, of the optimum number segments in the global queue and the current number of segments in the global queue 512 for a CPU $114_i$ if the current number of cache segments in the global queue 512 is relatively low, or less than an optimum number for the global queue. Thus, the optimum number parameter 308 for a particular CPU $114_i$ is reduced if there is relatively low number of segments in the global queue so that CPU 114i retains fewer cache segments in its local queue 204 because a lower optimum number for a CPU $114_i$ increases the number of cache segments maintained in the global queue 110. If the number of cache segments in the global queue 512 is relatively high, greater than an optimum amount, then the optimum number for CPU $114_i$ is increased to maintain more cache segments in the local queue 204 for CPU $114_i$ because a higher optimum number 308 for CPU $114_i$ reduces the number cache segments in the global queue 110 and increases number of cache segments maintained in CPU $114_i$. The machine learning module 304 is thus retrained to produce these optimum number parameters of cache segments to maintain in the local queues 204 based on the current number of cache segments in the global queue 110.

Figure 10:
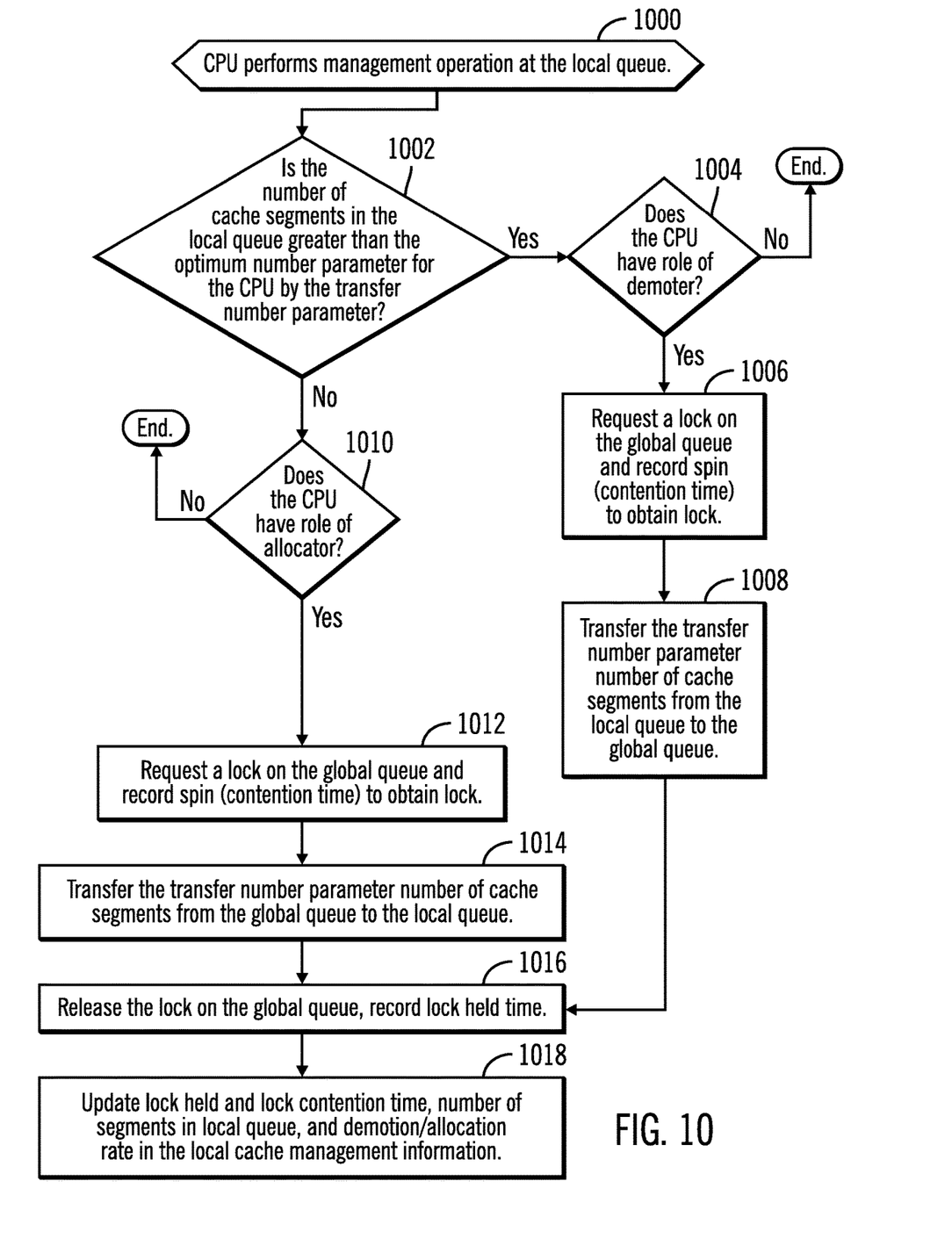
FIG. 10 illustrates an embodiment of operations performed by a processing unit to manage the local queue.

FIG. 10 illustrates an embodiment of operations performed by the local cache manager 208 to allocate/deallocate cache segments $108_i$ with respect to the local queue 204 according to the optimum number parameter 210 and transfer number parameter 212 calculated for the CPU $114_{ii}$ having the local queue 204 being managed. Upon initiating operations to manage the local queue 204, such as in response to one or a fixed number of operations to allocate a cache segment $108_i$ to the LRU list 206 from the local queue 204 or to demote a cache segment from the LRU list 206 to the local queue 204, the local cache manager 208 determines (at block 1002) whether the number of cache segments in the local queue 204 is greater than the optimum number parameter 210 for the CPU $114_i$ by the transfer number parameter 212. If (at block 1002) the number of cache segments $108_i$ in the local queue 204 exceeds the optimum number parameter 210 for the CPU $114_i$ by the transfer number parameter 212 and if (at block 1004) the CPU $114_i$ has a demoter role, then the local cache manager 208 requests (at block 1006) a lock on the global queue 110 and records the spin (contention) time waiting to obtain the lock. Upon obtaining the lock, the local cache manager 208 transfers (at block 1008) the transfer number parameter 212 of cache segments $108_i$ from the local queue 204 to the global queue 110.

If (at block 1002) the number of cache segments in the local queue 204 is less than the optimum number parameter 210 for the CPU $114_i$ by the transfer number parameter 212 and if (at block 1010) the CPU $114_i$ has an allocator role, then the local cache manager 208 requests (at block 1012) a lock on the global queue 110 and records the spin (contention) time waiting to obtain the lock. Upon obtaining the lock, the local cache manager 208 transfers (at block 1014) the transfer number parameter 212 of cache segments $108_i$ from the global queue 110 to the local queue 204. From block 1008 or 1014, the lock on the global queue 110 is released (at block 1016) and the lock held time is recorded. The local queue management information 400 is updated (at block 1018) based on the above operations, including updating the average lock held 410 and average lock contention 408 times for the global queue 110, the number of segments in the local queue 406, and the demotion 412/allocation 414 rates with respect to the global queue 110. If (at block 1004) the CPU $114_i$ does not have the role of demoter or if (at block 1010) the CPU $114_i$ does not have the role of allocator, then control ends without the CPU $114_i$ performing an allocate/demote operation until the required role is assigned. Those CPUs $114_i$ having a dynamically assigned role, may relinquish the role to another CPU $114_i$ periodically, after a number of allocate/deallocate operations, or based on the extent to which the local queue 204 number of cache segments is different from the optimum number.

With the operations of FIG. 10, the optimum number parameter 210 and the transfer number parameter 212 calculated by the machine learning module 304 are used to determine whether a CPU $114_i$ allocates from the global queue 110 more cache segments to the local queue 204 and demote cache segments to the global queue 110.

In the described embodiment, variables i, n, etc., when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
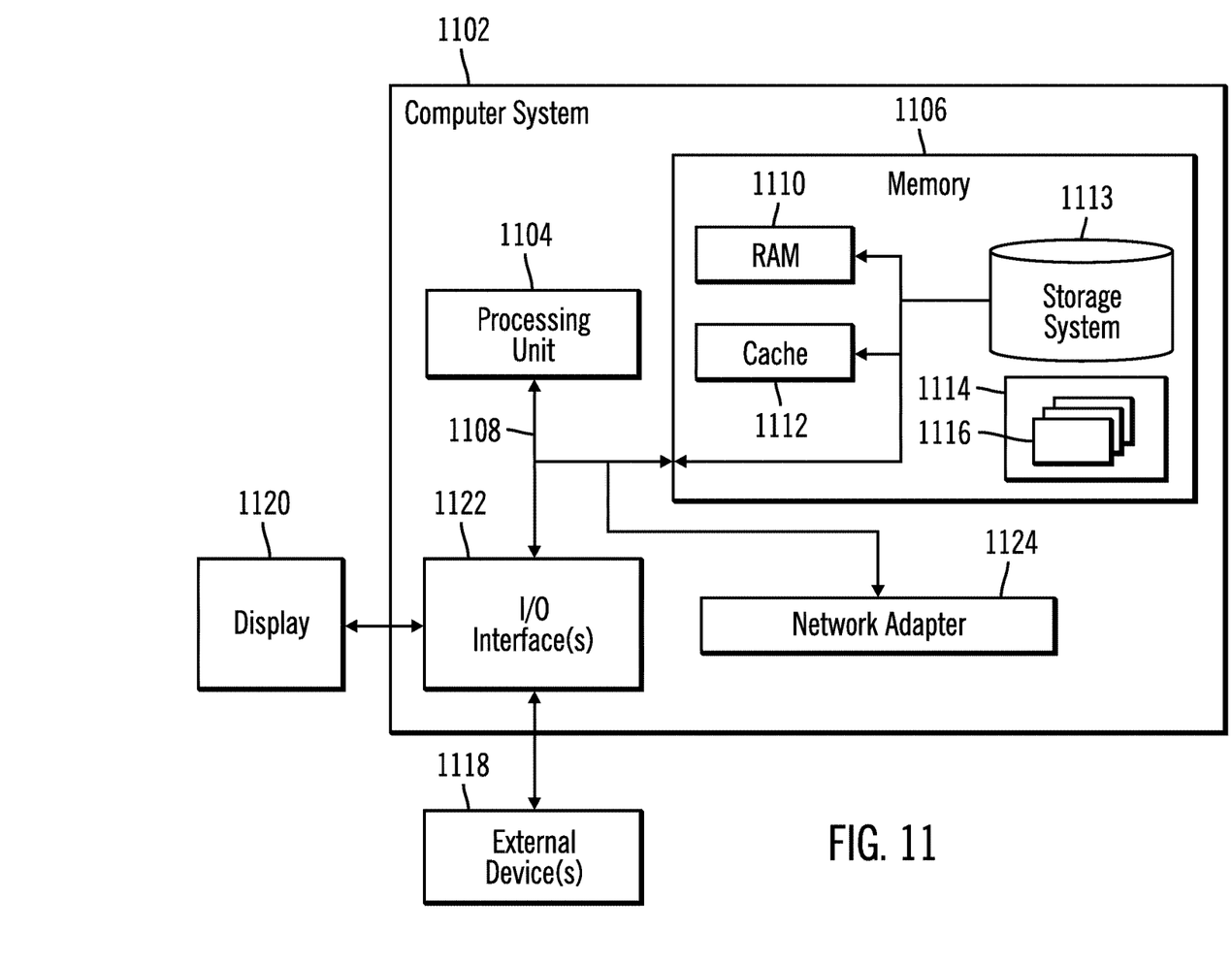
FIG. 11 illustrates a computing environment in which the components of FIG. 1 may be implemented.

The computational components of FIG. 1 may be implemented in one or more computer systems, such as the computer system 1102 shown in FIG. 11. Computer system/server 1102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, the computer system/server 1102 is shown in the form of a general-purpose computing device. The components of computer system/server 1102 may include, but are not limited to, one or more processors or processing units 1104, a system memory 1106, and a bus 1108 that couples various system components including system memory 1106 to processor 1104. Bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes a variety of computer system readable media. Such media may be any available media that is accessible by computer system/server 1102, and it includes both volatile and non-volatile media, removable and non-removable media.

System memory 1106 can include computer system readable media in the form of volatile memory, such as random access memory (RAM) 1110 and/or cache memory 1112. Computer system/server 1102 may further include other removable/non-removable, volatile/non-volatile computer system storage media. By way of example only, storage system 1113 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1108 by one or more data media interfaces. As will be further depicted and described below, memory 1106 may include at least one program product having a set (e.g., at least one) of program modules that are configured to carry out the functions of embodiments of the invention.

Program/utility 1114, having a set (at least one) of program modules 1116, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. The components of the computer 1102 may be implemented as program modules 1116 which generally carry out the functions and/or methodologies of embodiments of the invention as described herein. The systems of FIG. 1 may be implemented in one or more computer systems 1102, where if they are implemented in multiple computer systems 1102, then the computer systems may communicate over a network.

Computer system/server 1102 may also communicate with one or more external devices 1118 such as a keyboard, a pointing device, a display 1120, etc.; one or more devices that enable a user to interact with computer system/server 1102; and/or any devices (e.g., network card, modem, etc.) that enable computer system/server 1102 to communicate with one or more other computing devices. Such communication can occur via Input/Output (I/O) interfaces 1122.

Still yet, computer system/server 1102 can communicate with one or more networks such as a local area network (LAN), a general wide area network (WAN), and/or a public network (e.g., the Internet) via network adapter 1124. As depicted, network adapter 1124 communicates with the other components of computer system/server 1102 via bus 1108. It should be understood that although not shown, other hardware and/or software components could be used in conjunction with computer system/server 1102. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining cache segments in a cache to transfer between local queues used by processing units to a global queue, wherein the computer program product comprises a non-statutory computer readable storage medium having computer readable program code embodied therein that when executed performs operations, the operations comprising:

provided a machine learning module input comprising cache segment management information, related to management of segments in the local queues by the processing units and accesses of the global queue, to transfer cache segments between the local queues and the global queue to output an optimum number parameter comprising an optimum number of segments to maintain in a local queue and a transfer number parameter comprising a number of cache segments to move between a local queue and the global queue;

adjusting the transfer number parameter for at least one of the processing units to produce an adjusted transfer number parameter;

adjusting the optimum number parameter for at least one of the processing units to produce an adjusted optimum number parameter;

retraining the machine learning module based on the cache segment management information to output the adjusted transfer number parameter and the adjusted optimum number parameter for the processing units; and using the retrained machine learning module to output the transfer number parameter and the optimum number parameter for the processing units to use to manage transferring cache segments between the local queues and the global queue.

2. The computer program product of claim 1, wherein the adjusting the transfer number parameter for at least one of the processing units is based on current lock contention time for the global queue indicating an amount of time a processing unit waits to access a lock for the global queue, and wherein the adjusting the optimum number parameter for at least one of the processing units is adjusted based on based on a number of cache segments in the global queue.

3. The computer program product of claim 1,
wherein the retraining the machine learning module to produce the adjusted transfer number parameter for each processing unit comprises using a margin of error of the adjusted transfer number parameter for each processing unit and a current transfer number parameter calculated for each processing unit to adjust weights and biases at nodes in a hidden layer of the machine learning module to produce the adjusted transfer number parameter, and
wherein the retraining the machine learning module to produce the adjusted optimum number parameter for each processing unit comprises using a margin of error of the adjusted optimum number parameter for each processing unit and a current optimum number parameter calculated for each processing unit to adjust weights and biases at nodes in the hidden layer of the machine learning module to produce the adjusted optimum number parameter.

4. The computer program product of claim 1, wherein the adjusting the transfer number parameter comprises:
determining whether a current lock contention time for the global queue is below an optimum global lock contention time;
increasing the transfer number parameter in response to determining that the current lock contention time for the global queue exceeds the optimum global lock contention time; and
decreasing the transfer number parameter in response to determining that the current lock contention time for the global queue is less than the optimum global lock contention time.

5. The computer program product of claim 4,
wherein the increasing the transfer number parameter comprises adding (the current lock contention time minus the optimum global lock content time) divided by (a constant to scale time to a number of cache segments to transfer) to the transfer number parameter, and
wherein the decreasing the transfer number parameter comprises subtracting (the optimum global lock content time minus the current lock contention time) divided by (the constant) from the transfer number parameter.

6. The computer program product of claim 1, wherein the adjusting the optimum number parameter comprises adjusting the optimum number parameter for a plurality of the processing units based on a difference of an optimum number of cache segments in the global queue and a current number of cache segments in the global queue.

7. The computer program product of claim 1, wherein the adjusting the optimum number parameter comprises:
determining whether a number of cache segments in the global queue is less than an optimum number of cache segments in the global queue;
increasing the optimum number parameter in response to determining that the number of cache segments in the global queue is greater than the optimum number of cache segments in the global queue; and
decreasing the optimum number parameter in response to determining that the number of cache segments in the global queue is less than the optimum number of cache segments in the global queue.

8. The computer program product of claim 7,
wherein the decreasing the optimum number parameter comprises adding (the optimum number of cache segments in the global queue minus the number of cache segments in the global queue) divided by (a number of processing units time a constant); and
wherein the increasing the transfer number parameter comprises adding (the number of cache segments in the global queue minus the optimum number of cache segments in the global queue) divided by (a number of processing unites times the constant).

9. The computer program product of claim 1, wherein the machine learning module is retrained after a plurality of the processing units perform a number of instances of allocating a cache segment from a local queue or returning a cache segment to the local queue.

10. The computer program product of claim 1, wherein the cache segment management information related to management of segments in the local queues by the processing units comprises a plurality of input parameters comprising:
a number of demoting processing units demoting cache segments from a local queue to the global queue;
a number of allocating processing units allocating cache segments from the global queue to a local queue;
a number of cache segments allocated to the processing units;
an average rate of demotion of cache segments from the local queue to the global queue for all of the processing units;
an average rate of allocation of cache segments from the global queue to the local queue for each of the processing units;

a number of processing units dedicated to demote cache segments from the local queues to the global queue, wherein a plurality of processing units are temporarily assigned to demote cache segments from the local queues at the processing units to the global queue; and
number of processing units dedicated to allocate cache segments from the global queue to the local queues, wherein a plurality of processing units are temporarily assigned to allocate cache segments from the global queue to a local queue.

11. The computer program product of claim 1, wherein the cache segment management information related to accesses of the global queue to transfer cache segments between the local queues and the global queue comprises a plurality of input parameters comprising:
an average lock contention time comprising an average time processing units wait to receive a lock to access the global queue;
an average lock held time comprising an average time processing units hold the lock to access the global queue; and
an optimal number of cache segments in the global queue.

12. A system in communication with processing units, wherein each of the processing units has a local queue of cache segments, comprising:
a manager processing unit;
a memory having a cache of cache segments and a global queue of cache segments available to allocate to the processing units;
a machine learning module; and
a computer readable storage medium having computer readable program code embodied therein that when executed by the manager processing unit performs operations, the operations comprising:
providing the machine learning module input comprising cache segment management information, related to management of segments in local queues by the processing units and accesses of the global queue to transfer cache segments between the local queues and the global queue, to output an optimum number parameter comprising an optimum number of segments to maintain in a local queue and a transfer number parameter comprising a number of cache segments to move between a local queue and the global queue;
adjusting the transfer number parameter for at least one of the processing units to produce an adjusted transfer number parameter;
adjusting the optimum number parameter for at least one of the processing units to produce an adjusted optimum number parameter;
retraining the machine learning module based on the cache segment management information to output the adjusted transfer number parameter and the adjusted optimum number parameter for the processing units; and
using the retrained machine learning module to output the transfer number parameter and the optimum number parameter for the processing units to use to manage transferring cache segments between the local queues and the global queue.

13. The system of claim 12, wherein the adjusting the transfer number parameter for at least one of the processing units is based on current lock contention time for the global queue indicating an amount of time a processing unit waits to access a lock for the global queue, and wherein the adjusting the optimum number parameter for at least one of the processing units is adjusted based on based on a number of cache segments in the global queue.

14. The system of claim 12,
wherein the retraining the machine learning module to produce the adjusted transfer number parameter for each processing unit comprises using a margin of error of the adjusted transfer number parameter for each processing unit and a current transfer number parameter calculated for each processing unit to adjust weights and biases at nodes in a hidden layer of the machine learning module to produce the adjusted transfer number parameter, and
wherein the retraining the machine learning module to produce the adjusted optimum number parameter for each processing unit comprises using a margin of error of the adjusted optimum number parameter for each processing unit and a current optimum number parameter calculated for each processing unit to adjust weights and biases at nodes in the hidden layer of the machine learning module to produce the adjusted optimum number parameter.

15. The system of claim 12, wherein the adjusting the transfer number parameter comprises:
determining whether a current lock contention time for the global queue is below an optimum global lock contention time;
increasing the transfer number parameter in response to determining that the current lock contention time for the global queue exceeds the optimum global lock contention time; and
decreasing the transfer number parameter in response to determining that the current lock contention time for the global queue is less than the optimum global lock contention time.

16. The system of claim 12, wherein the adjusting the optimum number parameter comprises adjusting the optimum number parameter for a plurality of the processing units based on a difference of an optimum number of cache segments in the global queue and a current number of cache segments in the global queue.

17. The system of claim 12, wherein the adjusting the optimum number parameter comprises:
determining whether a number of cache segments in the global queue is less than an optimum number of cache segments in the global queue;
increasing the optimum number parameter in response to determining that the number of cache segments in the global queue is greater than the optimum number of cache segments in the global queue; and
decreasing the optimum number parameter in response to determining that the number of cache segments in the global queue is less than the optimum number of cache segments in the global queue.

18. A method for determining cache segments in a cache to transfer between local queues used by processing units to a global queue, comprising:
providing a machine learning module input comprising cache segment management information, related to management of segments in the local queues by the processing units and accesses of the global queue to transfer cache segments between the local queues and the global queue, to output an optimum number parameter comprising an optimum number of segments to maintain in a local queue and a transfer number parameter comprising a number of cache segments to move between a local queue and the global queue;

adjusting the transfer number parameter for at least one of the processing units to produce an adjusted transfer number parameter;

adjusting the optimum number parameter for at least one of the processing units to produce an adjusted optimum number parameter;

retraining the machine learning module based on the cache segment management information to output the adjusted transfer number parameter and the adjusted optimum number parameter for the processing units; and using the retrained machine learning module to output the transfer number parameter and the optimum number parameter for the processing units to use to manage transferring cache segments between the local queues and the global queue.

19. The method of claim 18, wherein the adjusting the transfer number parameter for at least one of the processing units is based on current lock contention time for the global queue indicating an amount of time a processing unit waits to access a lock for the global queue, and wherein the adjusting the optimum number parameter for at least one of the processing units is adjusted based on based on a number of cache segments in the global queue.

20. The method of claim 18,
wherein the retraining the machine learning module to produce the adjusted transfer number parameter for each processing unit comprises using a margin of error of the adjusted transfer number parameter for each processing unit and a current transfer number parameter calculated for each processing unit to adjust weights and biases at nodes in a hidden layer of the machine learning module to produce the adjusted transfer number parameter, and wherein the retraining the machine learning module to produce the adjusted optimum number parameter for each processing unit comprises using a margin of error of the adjusted optimum number parameter for each processing unit and a current optimum number parameter calculated for each processing unit to adjust weights and biases at nodes in the hidden layer of the machine learning module to produce the adjusted optimum number parameter.

21. The method of claim 18, wherein the adjusting the transfer number parameter comprises:
determining whether a current lock contention time for the global queue is below an optimum global lock contention time;
increasing the transfer number parameter in response to determining that the current lock contention time for the global queue exceeds the optimum global lock contention time; and
decreasing the transfer number parameter in response to determining that the current lock contention time for the global queue is less than the optimum global lock contention time.

22. The method of claim 18, wherein the adjusting the optimum number parameter comprises adjusting the optimum number parameter for a plurality of the processing units based on a difference of an optimum number of cache segments in the global queue and a current number of cache segments in the global queue.

23. The method of claim 18, wherein the adjusting the optimum number parameter comprises:
determining whether a number of cache segments in the global queue is less than an optimum number of cache segments in the global queue;
increasing the optimum number parameter in response to determining that the number of cache segments in the global queue is greater than the optimum number of cache segments in the global queue; and
decreasing the optimum number parameter in response to determining that the number of cache segments in the global queue is less than the optimum number of cache segments in the global queue.

\* \* \* \* \*